United States Patent [19]

Maurer

[11] Patent Number: 4,614,042

[45] Date of Patent: Sep. 30, 1986

[54] MEASURING AND INSTRUCTIONAL RULER DEVICE

[76] Inventor: Francis E. Maurer, 14600 Barkwood Ct., Chester, Va. 23831

[21] Appl. No.: 800,812

[22] Filed: Nov. 22, 1985

[51] Int. Cl.$^4$ .......................... G09B 9/12; B43L 7/00
[52] U.S. Cl. ..................................... 33/494; 434/196
[58] Field of Search ............... 434/112, 113, 117, 195, 434/196; 33/403, 483, 487, 494

[56] References Cited

U.S. PATENT DOCUMENTS

| | | |
|---|---|---|
| 1,594,376 | 8/1926 | Passmore . |
| 2,289,717 | 7/1942 | Montgomery . |
| 2,371,325 | 3/1945 | Wessborg . |
| 2,803,069 | 8/1957 | Struna . |
| 2,835,988 | 5/1958 | Hilkene . |
| 3,805,395 | 4/1974 | Hopkinson . |
| 3,871,114 | 3/1975 | Honig ................................. 434/196 |

Primary Examiner—Harry N. Haroian
Attorney, Agent, or Firm—Norman B. Rainer

[57] ABSTRACT

A measuring and instructional ruler device is provided for use by children and persons having learning impediments or physical handicaps. The device is comprised of a base panel having one inch subdivisions delineated by both visual indicia and tactile features, and a top panel adapted to slide upon the base panel and having a series of tabs whose widths sequentially increase in fractions of an inch. The device is used by aligning the first or zero subdivision with a first of two points between which the distance is to be measured, determining the appropriate subdivision closest to the second point, and adding to such closest subdivision the fractional value of the tab that fills the space between the end of the closest subdivision and the second point of the distance being measured.

4 Claims, 6 Drawing Figures

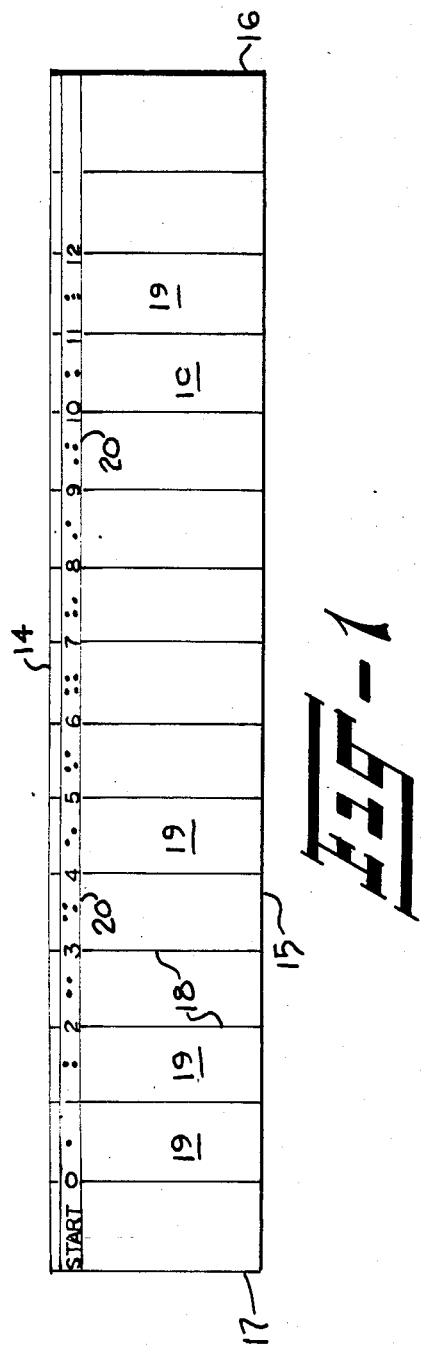

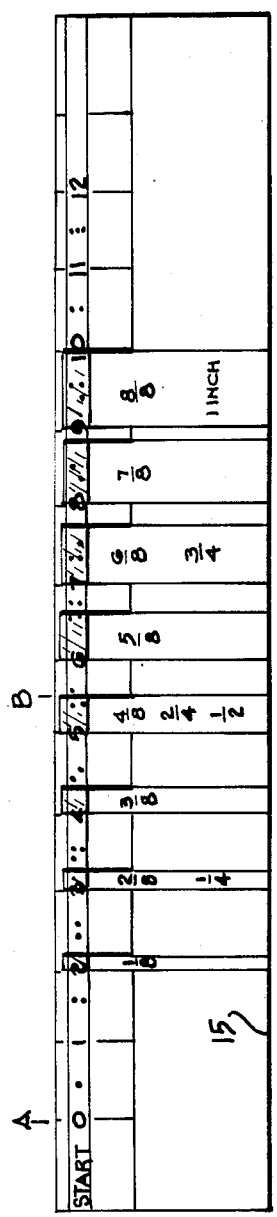
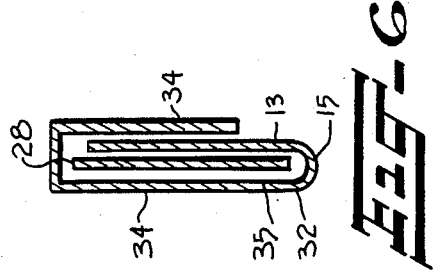
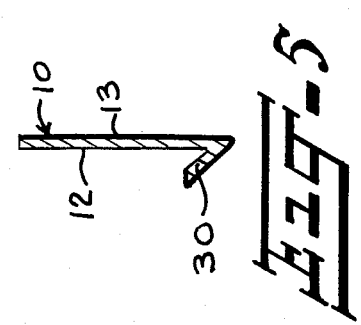
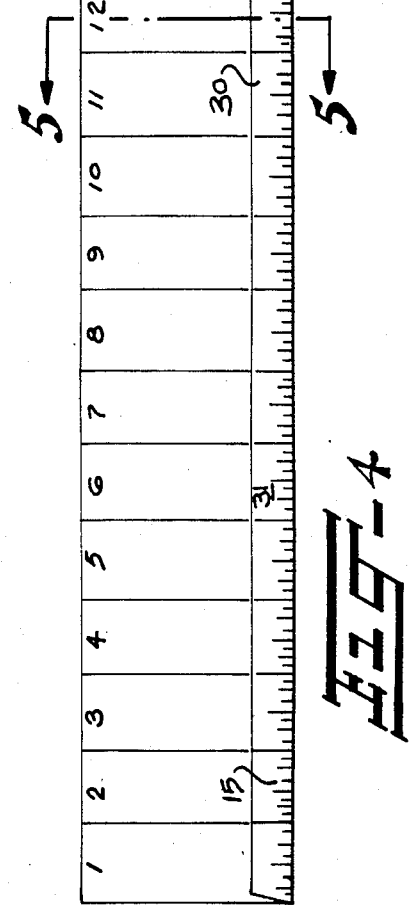

MEASURING AND INSTRUCTIONAL RULER DEVICE

BACKGROUND OF THE INVENTION

This invention concerns a ruler device for measuring relatively short distances, and for teaching the user the principles of distance measurement and the concept of fractions of a unit of measurement.

Young children and persons having various learning impediments or physical handicaps find difficulty in using an ordinary ruler for measurement of the straight linear distance between two points. For example, even when the distance to be measured is across a flat surface, a visually impaired or blind person will have difficulty in using an ordinary ruler. Although braille-imprinted rulers have been designed to aid blind persons, the braille markings are effective in designating only relatively large intervals such as one inch spaces, and are not generally effective in designating fractions of an inch as small as $\frac{1}{8}$ inch.

The concept of fractions of an inch is frequently not easily grasped by persons of slow learning ability taught by abstract or mathematical approaches without visualization means, and such persons generally do not comprehend the standard scale markings on a conventional ruler.

U.S. Pat. No. 2,803,069 to Struna discloses an educational device for the use in front of a classroom of students for teaching the concept of fractions of units of linear measurement. However, its requisite oversize nature may be confusing to students who cannot correlate the deliberately exaggerated size of the teaching device with the actual dimensions of distances they will be trying to measure. Furthermore, the Struna device is of complex construction and not intended for actual use by students in attempting real measurements. Even if the Struna device were scaled down to coincide with dimensions of a standard ruler, its complexity and attendant high cost would preclude widespread use as a teaching aid for individual students. It is to be further appreciated that students in the lower school grades would generally be reluctant to add a bulky ruler device to their already cumbersome daily carrying load of books and other school supplies.

It is accordingly an object of this invention to provide a ruler device for measuring distance and for providing instruction in the use of a ruler.

It is another object of this invention to provide a ruler as in the foregoing object which provides functionally symbolic means for perceiving fractions of an inch.

It is a further object of the present invention to provide a ruler of the aforesaid nature which enables a blind person to measure distance to within small fractions of an inch.

It is still another object of this invention to provide a ruler of the aforesaid nature of sufficiently compact construction and low cost that it may find widespread use amongst students having a need for such ruler.

These objects and other objects and advantages of the invention will be apparent from the following description.

SUMMARY OF THE INVENTION

The above and other beneficial objects and advantages are accomplished in accordance with the present invention by a measuring and instructional ruler comprised of:

(a) a base panel having flat upper and lower faces, an elongated rectangular perimeter bounded by parallel straight upper and lower long edges and parallel straight short leading and trailing end edges, said upper face having one inch subdivisions delineated by both visual indicia and tactile features, said subdivisions beginning with a zero line, and (b) a top panel having flat upper and lower faces, parallel straight upper and lower edges, and a series of tabs having parallel straight leading and trailing side edges directed perpendicularly upward from said upper straight edge to a straight upper extremity perpendicularly disposed to said side edges and defining the width of the tab, said tabs having sequentially increasing widths corresponding to fractions of an inch and associated visual or tactile indicia, said trailing side edges being spaced one inch apart, and the distance between the upper extremities of the tabs and lower edge of the panel being substantially equal to the distance between upper and lower long edges of said base panel, and the lower face of said top panel being adapted to slide across the upper face of said base panel.

In using the ruler to measure the distance between first and second points, the zero line, which may coincide with the trailing short edge of the base panel is aligned with a first point, and the user observes which inch-long subdivision the second point falls within. The top panel is then slidingly moved along the base panel until a tab is found which fits between the second point and the lesser valued line designation of the bracketing subdivision. The distance reading is determined by seeing or feeling the value of the preceding subdivision, and adding to that value the fractional value of the tab as seen or felt.

In a preferred embodiment of the ruler of this invention, the lower long edge of the base panel is provided with means such as a folded lip for holding the top panel during its sliding movement. The base panel may be further provided with a conventionally ruled scale of markings corresponding to the delineated one inch subdivisions.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawings:

FIG. 1 is a top plan view of an embodiment of the base panel component of a ruler of this invention, shown as half of full scale size.

FIG. 2 is a top plan view of an embodiment of the top panel component of a ruler of this invention.

FIG. 3 is a top plan view of a ruler of this invention in operative mode using the components of FIGS. 1 and 2.

FIG. 4 is a top plan view of an alternative embodiment of the base panel.

FIG. 5 is a sectional side view taken along the line 5—5 of FIG. 4.

FIG. 6 is a sectional side view of a further embodiment of a ruler of this invention.

DESCRIPTION OF THE PREFERRED EMBODIMENT

Referring to FIGS. 1–6, a ruler device of this invention is shown comprised of base panel 10 and top panel 11, both panels being of substantially integral monolithic construction, having been fabricated of stiff cardboard or plastic sheet stock.

Base panel 10, having upper and lower faces 12 and 13, respectively, has an elongated rectangular perimeter bounded by parallel straight upper and lower long edges 14 and 15, respectively, and straight short leading and trailing end edges 16 and 17, respectively. Said upper face is provided with numbered linear rulings 18 perpendicularly disposed to upper long edge 14, and defining inch-wide subdivision regions 19 having visual indicia or tactile indicia such as upraised braille dot patterns 20 positioned adjacent upper long edge 14.

Top panel 11, having flat upper and lower faces, 21 and 22, respectively, is bounded in part by parallel straight upper and lower edges 23 and 24, respectively, and provided with a series of tabs 25 emergent from upper edge 23 as continuous integral extensions of said panel. Said tabs are bounded by parallel straight leading and trailing side edges 26 and 27, respectively, directed perpendicularly upward from upper edge 23, and straight upper extremities 28 disposed in a straight line locus above upper edge 23 and parallel thereto. Said trailing side edges are spaced one inch apart to correspond with the inch-wide subdivisions 19 of base panel 10.

The widths of said tabs, defined by the perpendicular distance between said leading and trailing side edges, are of sequentially increased size, corresponding to fractions of an inch. In the illustrated embodiment, said fractions are of $\frac{1}{8}''$ units. In other embodiments, the fractional units may be 1/16'' or $\frac{1}{4}''$. Each tab may be provided with visible indicia 29.

In the embodiment shown in FIG. 3, the distance between upper extremities 28 and lower edge 24 of said top panel is less than the height of said base panel, measured between upper and lower long edges 14 and 15, respectively. The upper extremities 28 of the tabs are in fact below the numerical indicia associated with rulings 18 of the base panel, thereby avoiding obscurement of said indicia. In certain embodiments, flat clear plastic strips may be positioned below said tabs so that they may extend higher without obscuring the numerical indicia of the base panel.

In use, as shown in FIG. 3, the zero line of the base panel (or trailing edge 17 if identical with said zero line) is aligned with a first point such as point A. The user then slides the top panel along the upper face of the base panel until a tab is found which exactly fills the space between point B and the numbered ruled line on the base panel closest to the left side of point B. The distance reading is determined by seeing or feeling the value of said numbered ruled line, and adding to that value the fractional value of the tab as seen or felt.

In the embodiment of the base panel shown in FIGS. 4 and 5, an upwardly folded retaining lip 32 having upper extremity 33 is provided as a continuous integral extension from lower long edge 15. The lip functions as a track-like trough to facilitate sliding movement of the top panel in a manner to keep the tabs in parallel alignment with the numbered ruled lines of the base panel. The front face of said lip may bear a conventional scale of ruled lines 31 in alignment with said numbered ruled lines, serving to further instruct the student in the use of a ruler.

In the embodiment of FIG. 6, a protective flap 34, representing a continuous integral extension of retaining lip 32 beginning at fold line 35, rises upwardly, folds over upper extremities 28 of the tabs of top panel 11, and descends in contact with lower face 13 of base panel 10. In such manner, flap 34 forms a protective enclosure for the ruler device.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A measuring and instrucional ruler comprised of:
    (a) a base panel having flat upper and lower faces, an elongated rectangular perimeter bounded by parallel straight upper and lower long edges and parallel straight short leading and trailing end edges, said upper face having one inch subdivisions delineated by both visual indicia and tactile features, said subdivisions beginning with a zero line, and
    (b) a top panel having flat upper and lower faces, parallel straight upper and lower edges, and a series of tabs having parallel straight leading and trailing side edges directed perpendicularly upward from said upper straight edge to a straight upper extremity perpendicularly disposed to said side edges and defining the width of the tab, said tabs having sequentially increasing widths corresponding to fractions of an inch and associated visual or tactile indicia, said trailing side edges being spaced one inch apart, and the distance between the upper extremities of the tabs and lower edge of the panel being substantially equal to the distance between upper and lower long edges of said base panel, and the lower face of said top panel being adapted to slide across the upper face of said base panel.

2. The ruler of claim 1 wherein the lower long edge of the base panel is provided with an upwardly folded lip adapted to hold the top panel during its sliding movement.

3. The ruler of claim 2 wherein said upwardly folded lip is provided with a conventionally ruled scale of markings corresponding to the delineated one inch subdivisions.

4. The ruler of claim 1 wherein a transparent protective flap is associated with said base panel as a continuous integral extension thereof and adapted to fold over the upper extremities of the tabs of said top panel to form a protective enclosure for the ruler.

* * * * *